Dec. 26, 1950     W. A. RAY     2,535,602

THERMOCOUPLE FOR GAS OR OIL BURNERS

Filed July 12, 1948

WILLIAM A. RAY,
INVENTOR.

BY John Flam
ATTORNEY

Patented Dec. 26, 1950

2,535,602

UNITED STATES PATENT OFFICE 2,535,602

THERMOCOUPLE FOR GAS OR OIL BURNERS

William A. Ray, North Hollywood, Calif., assignor to General Controls Co., a corporation of California Application July 12, 1948, Serial No. 38,343

3 Claims. (Cl. 136—4)

This invention relates to a thermocouple structure adapted to be utilized for the control of fuel burners, such as gas or oil burners.

This application is a continuation in part of application Serial No. 364,356, filed November 5, 1940, in the name of William A. Ray, now Patent No. 2,466,274, issued April 5, 1949, and entitled: Thermocouple Operated Control System.

In many forms of gas burner systems, use is made of a thermoelectric generator influenced by the heat of the flame, and arranged in an electric circuit to cause interruption in the supply of fuel.

Such thermocouples are formed by joining two thermoelectrically dissimilar metals, such as iron and copper, or Copel and Chromel, and subjecting the junction to a temperature higher than that at the end junctions between these thermoelectric conductors and the leads. When the "hot" junction is heated, a minute electric power is generated in a well understood manner. The temperature differential between the hot and cold junctions determines the amount of power generated; and the greater this differential, the greater the power.

This power, although minute, is utilized to maintain a definite control condition, such as to maintain a fuel valve open, for passing fuel to the burner. Upon flame failure, the hot junction that had been subjected to the heat of the flame cools; and, ultimately, the temperature differential is reduced to such an extent that the power generated is insufficient to maintain the control for passing fuel to the burner. There is a consequent interruption to the flow of fuel, and the system is inactive, preventing escape of unignited fuel.

In the past, it has been common to insert the hot junction directly in the flame, the cold junctions being exposed to the circumambient temperature of the furnace chamber or of the atmosphere. In such an arrangement an appreciable time must elapse before the junctions attain substantially equal temperature so as to interrupt the flow of fuel.

It is one of the objects of this invention to provide a simple and effective thermocouple structure that insures prompt response of the control system upon flame failure.

In order to accomplish this result, the thermocouple is so arranged that both the hot junction and the cold junction are inserted into the flame; and, although the flame temperature may be the same in the absence of the junctions, their presence results in a difference in temperature at the junctions sufficient to provide a controlling electromotive force. It is necessary that the temperature differential be only a few hundred degrees Fahrenheit. This difference is readily attained by proper choice and arrangement of the thermoelectric conductors.

The arrangement consists of three thermoelectric conductors serially joined to form two junctions, the end conductors having different capacities to conduct heat away from the flame. That junction which is joined to the conductor which conducts heat faster has a materially lower temperature than the other junction. There are several ways in which this result may be effected.

It is accordingly another object of this invention to provide a thermocouple structure in which both the hot and cold juctions may be placed in a flame, and yet in which there is generation of an adequate electromotive force for control purposes.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings.

Figure 1:
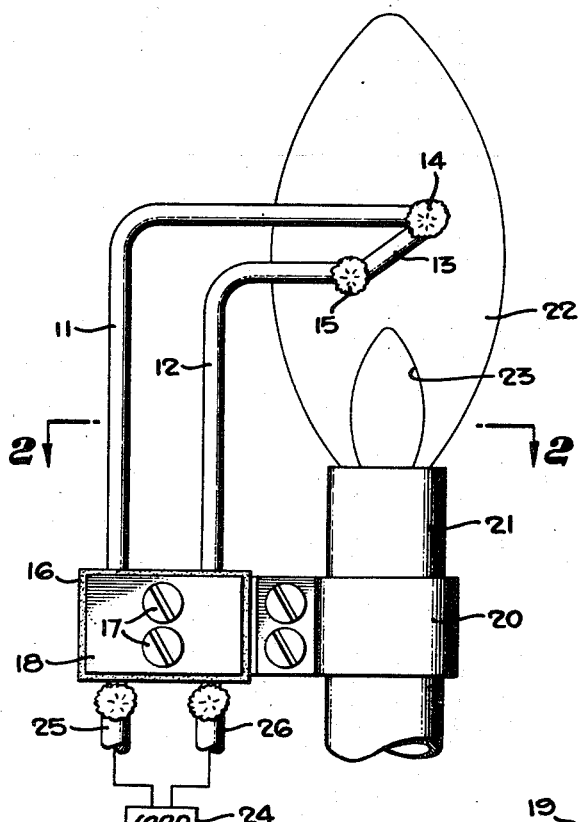
Figure 1 is an elevation of a thermocouple structure incorporating the invention shown in use in connection with a gas burner, the scale of the figure being enlarged.
Figure 2:
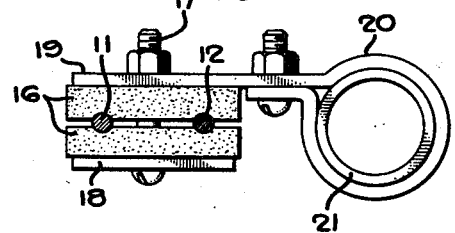
Fig. 2 is a sectional view, taken along a plane corresponding to line 2—2 of Fig. 1.
Figure 3:
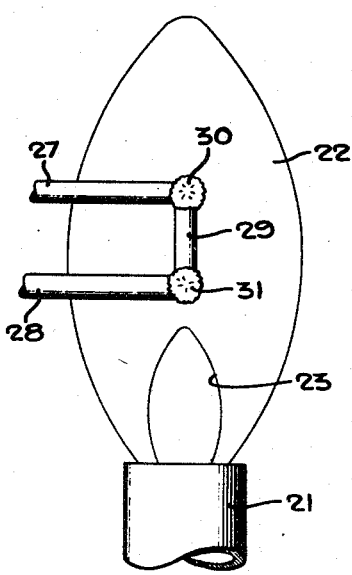
Fig. 3 is a view similar to Fig. 1 of a modified form of the invention.

The thermocouple structure shown in Figs. 1 and 2 incorporates the end conductors 11 and 12 and an intermediate conductor 13. The intermediate conductor 13 is shown as welded, fused, or otherwise joined, to end conductors 11 and 12 to form the junctions 14 and 15. These conductors can be of 18 gauge wire of materials to be hereinafter referred to. The intermediate conductor 13 is quite short and is of the order of three-sixteenths of an inch long.

The end conductors 11 and 12 may conveniently be clamped between two insulation blocks 16 appropriately grooved to conform to the conductors 11 and 12. These insulation blocks may be clamped together by the aid of bolts 17 which pass through the end plate 18 and an extension 19 of a clamping bracket 20. This clamping bracket 20 surrounds a burner tube 21 (which may be of the Bunsen type), for supporting the thermocouple structure.

The burner tube 21 serves to provide a pilot flame 22. Both junctions 14 and 15 are placed in the flame 22 above the inner cone 23, which defines a cooler root portion of the flame. The points where these junctions 14 and 15 are located would have substantially the same temperature if the thermocouple junctions were out of the flame. However, due to the structure now to be described, the temperature of junction 14 is maintained substantially lower than the temperature of junction 15. In this way, a thermoelectric current is generated which may be utilized for the operation of a control apparatus indicated by the load 24. This load 24 may be joined to the end conductors 11 and 12 by the aid of copper conductors 25 and 26 welded or fused to the lower ends of these conductors 11 and 12.

The end conductors 11 and 12 are made of material that is thermoelectrically different from the material of the intermediate conductor 13. Thus, for example, the end conductors 11 and 12 may be made of Copel and the intermediate conductor of Chromel. Both of these materials are well known alloys suitable for thermocouple construction.

The junction 14 is maintained cooler than junction 15, since the end conductor 11 which forms the junction 14 has a greater mass within the flame 22 than the other the other end conductor 12 which forms the junction 15. Accordingly, there is a greater heat conduction away from the junction 14 than from junction 15. In other words, the cooling effect of conductor 11 is greater than the cooling effect of conductor 12.

Should the pilot flame 22 become extinguished, or fail, there is a very rapid equalization of temperature between the two thermocouple junctions 14 and 15. This is due to the fact that the intermediate conductor 13 is short, and transfer of heat from hot junction 15 to cold junction 14 is quite rapid. Furthermore, the performance of the thermocouple structure is entirely independent of the temperature of the circumambient atmosphere.

Although the end conductors 11 and 12 have been described as made from the same material such as Copel, it is possible to obtain the same effects when different materials are used for these end conductors. Thus, the conductor 11 may be made from thermoelectric material which has better heat conductivity than conductor 12; such, for example, as platinum or silver. This greater heat conductivity serves to lower the temperature of the junction 14 still further. In fact, under such circumstances, the length of the end conductors in the flame 22 may even be the same; and yet one junction will be maintained at a lower temperature than the other.

This form is illustrated in Fig. 2. In this form the end conductor 27 is made of a material that has relatively high heat conductivity, such as platinum or silver. The other end conductor 28 may be made of Copel, and the intermediate conductor 29 may be made of Chromel to form the cold junction 30 and the hot junction 31. As before, these junctions 30 and 31 are located in the main portion of the flame away from the inner cone 23. The better heat conducting element 27 serves to reduce the temperature of the junction 30 substantially below that of the temperature of junction 31.

In use, it has been found that temperature differentials of the order of several hundred degrees Fahrenheit can be steadily maintained between the junctions. This is sufficient to produce the required electrical energy for control purposes.

The inventor claims:

1. A thermocouple structure formed of two end conductors and an intermediate conductor, all three conductors being serially joined to form a pair of thermoelectric junctions, said intermediate conductor being of a material thermoelectrically dissimilar to those of the end conductors, both junctions thus formed being inserted in a flame and located at points in the flame that would have substantially the same temperature if the junctions be removed from the flame, the end conductors being dissimilar and of the same cross sectional areas, the heat conductivity of one of them being greater than that of the other end conductor, and the thermoelectric power of the junction formed between the intermediate conductor and that end conductor which has greater heat conductivity being less than that of the other junction.

2. A thermocouple structure formed of two end conductors and an intermediate conductor, all three conductors being serially joined to form a pair of thermoelectric junctions, said intermediate conductor being of a material thermoelectrically dissimilar to those of the end conductors, both junctions thus formed being inserted in a flame and located at points in the flame that would have substantially the same temperature if the junctions be removed from the flame, the end conductors being dissimilar, the heat conductivity of one of them being greater than that of the other end conductor, and the thermoelectric power of the junction formed between the intermediate conductor and that end conductor which has greater heat conductivity being less than that of the other junction.

3. A thermocouple structure formed of two end conductors and an intermediate conductor, all three conductors being serially joined to form a pair of thermoelectric junctions, said intermediate conductor being of a material thermoelectrically dissimilar to those of the end conductors, both junctions thus formed being inserted in a flame and located at points in the flame that would have substantially the same temperature if the junctions be removed from the flame, the end conductors being dissimilar and of the same cross sectional areas, the heat conductivity of one of them being greater than that of the other end conductor, and the thermoelectric power of the junction formed between the intermediate conductor and that end conductor which has greater heat conductivity being less than that of the other junction, the length within the flame of that end conductor which has greater heat conductivity being greater than the length within the flame of the other end conductor.

WILLIAM A. RAY.

REFERENCES CITED

The following references are of record in the file of this patent:

UNITED STATES PATENTS

| Number | Name | Date |
| --- | --- | --- |
| 1,863,373 | Harrison | June 14, 1932 |
| 2,114,446 | Hildebrecht | Apr. 19, 1938 |
| 2,189,829 | Wunsch et al. | Feb. 13, 1940 |
| 2,337,000 | Ray | Dec. 14, 1943 |
| 2,370,326 | Ray | Feb. 27, 1945 |